(12) United States Patent
Brahmaiah et al.

(10) Patent No.: US 12,726,469 B2
(45) Date of Patent: Sep. 1, 2026

(54) SERVICE FUNCTION AUTHORIZATION

(71) Applicant: Nokia Technologies Oy, Espoo (FI)

(72) Inventors: Topuri Brahmaiah, Bangalore (IN); Sireesha Bommisetty, Bangalore (IN); German Peinado Gomez, Wroclaw (PL); Mallikarjunudu Makham, Bangalore (IN); Saurabh Khare, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 215 days.

(21) Appl. No.: 18/465,628

(22) Filed: Sep. 12, 2023

(65) Prior Publication Data

US 2024/0098080 A1 Mar. 21, 2024

(30) Foreign Application Priority Data

Sep. 16, 2022 (IN) ............................. 202241053117

(51) Int. Cl.
*H04L 29/06* (2006.01)
*H04L 9/40* (2022.01)

(52) U.S. Cl.
CPC ................................ *H04L 63/0823* (2013.01)

(58) Field of Classification Search
CPC .................................................. H04L 63/0823
See application file for complete search history.

(56) References Cited

U.S. PATENT DOCUMENTS 6,754,829 B1 6/2004 Butt et al.
6,820,063 B1 11/2004 England et al.
6,880,080 B1 4/2005 Penders
10,461,942 B1 * 10/2019 Vo ........................ H04L 9/3263
11,622,276 B1 * 4/2023 Wan ...................... H04W 12/71 455/411
12,425,388 B2 * 9/2025 Bykampadi ......... H04L 63/0281
2017/0054710 A1 * 2/2017 Xiong ................ H04L 63/0823
2019/0251241 A1 * 8/2019 Bykampadi ......... H04W 12/009
2021/0089666 A1 * 3/2021 Panuganti ............. H04L 63/166
2021/0377054 A1 * 12/2021 Mahajan ................ G06F 9/455
2022/0353802 A1 * 11/2022 Gupta .................. H04W 48/16
2023/0106940 A1 * 4/2023 Choyi .................. H04L 9/3239 713/159
2023/0224782 A1 * 7/2023 Landais ............... H04W 36/14 370/331
2024/0214807 A1 * 6/2024 Rivera ............... H04W 12/069
2025/0023790 A1 * 1/2025 Robitzsch .............. H04L 67/02
2025/0063364 A1 * 2/2025 Lei ...................... H04W 12/106
(Continued)

FOREIGN PATENT DOCUMENTS

EP 3879784 A1 9/2021
WO 2018013925 A1 1/2018

OTHER PUBLICATIONS

Ahmed M Alwakeel et al., A Pattern for a Virtual Network Function (VNF), Aug. 26, 2019, ACM, pp. 1-7. (Year: 2016).*
(Continued)

*Primary Examiner* — Luu T Pham
*Assistant Examiner* — Fahimeh Mohammadi
(74) *Attorney, Agent, or Firm* — SQUIRE PATTON BOGGS (US) LLP

(57) ABSTRACT

Inter-alia, methods and apparatuses are disclosed for authorization of a network function consumer by a network function provider.

12 Claims, 8 Drawing Sheets

(56) References Cited

U.S. PATENT DOCUMENTS

| | | | | |
|---|---|---|---|---|
| 2025/0168155 | A1* | 5/2025 | Li | H04W 12/084 |
| 2025/0220012 | A1* | 7/2025 | Smeets | H04W 12/043 |
| 2025/0379868 | A1* | 12/2025 | Baskaran | H04L 63/101 |

OTHER PUBLICATIONS

Ilya Moiseenko et al., Consumer / Producer Communication with Application Level Framing in Named Data Networking, Sep. 30, 2015, ACM, pp. 99-108. (Year: 2015).*

Alberto Compagno et al., Secure Producer Mobility in Information-Centric Network, Sep. 26, 2017, ACM, pp. 163-169. (Year: 2017).*

Nada Kapidzic et al., A Certificate Management System: Structure, Functions and Protocols, Aug. 6, 2002, IEEE, pp. 153-160. (Year: 2002).*

Office action received for corresponding European Patent Application No. 23196812.4, dated Feb. 10, 2025, 6 pages.

Extended European Search Report received for corresponding European Patent Application No. 23196812.4, dated Nov. 6, 2023, 9 pages.

"3rd Generation Partnership Project; Technical Specification Group Services and System Aspects; Study on enhanced security aspects of the 5G Service BasedArchitecture (SBA); (Release 17)", 3GPP TR 33.875, V0.4.0, Aug. 2021, pp. 1-44.

"Kerberos Protocol Explained", VbScrub, Retreived on Nov. 30, 2023, Webpage available at : https://web.archive.org/web/20200624174514/https://vbscrub.com/2020/05/13/kerberos-protocol-explained/.

"3rd Generation Partnership Project; Technical Specification Group Services and System Aspects; Study on enhanced security aspects of the 5G Service Based Architecture (SBA); (Release 18)", 3GPP TR 33.875, V1.3.0, Aug. 2022, pp. 1-72.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"3rd Generation Partnership Project; Technical Specification Group Services and System Aspects; Network Domain Security (NDS); Authentication Framework (AF) (Release 17)", 3GPP TS 33.310, V17.3.0, Jun. 2022, pp. 1-59.

"OAuth2.0", OAuth, Retreived on Sep. 28, 2023, Webpage available at : https://oauth.net/2/.

"3rd Generation Partnership Project; Technical Specification Group Services and System Aspects; Telecommunication management; Principles and high level requirements (Release 17)", 3GPP TS 32.101, V17.0.0, Mar. 2022, pp. 1-68.

European Communication pursuant to Article 94(3) EPC, corresponding to EP Application No. 23 196 812.4, dated Sep. 11, 2025.

* cited by examiner

| Table 6.1.3c.3-1: NF TLS Client and Server Certificate Profile | | | | |
|---|---|---|---|---|
| Version | | v3 | | |
| Serial Number | | Unique Positive Integer in the context of the issuing Root CA and not longer than 20 octets. | | |
| Subject DN | | C=<Country><br>O= Home Domain Name (e.g., in "5gc.mnc<MNC>.mcc<MCC>.3gppnetwork.org" format) as defined in clause 28.2 of TS 23.003 [55]) | | |
| Validity Period | | 3 years or less | | |
| Signature | | See clause 6.1.1 for the list of supported signature algorithms. | | |
| Subject Public Key Info | | See clause 6.1.1 for the list of supported public key types. | | |
| Extensions | OID | Mandatory | Criticaly | Value |
| ... | ... | ... | ... | ... |
| subjectAltName | {id-ce 17} | TRUE | TRUE | Multiple subjectAltName entries can be used as a sequence, see below for the detailed instructions. |
| ... | ... | ... | ... | ... |

Fig.5

SERVICE FUNCTION AUTHORIZATION

FIELD

The following disclosure relates to the field of communication technology, in particular in a communication network, in particular a wireless communication network. The disclosure relates to authorization, in particular authorization of a network function consumer (NFc) to access a service provided by a network function producer (NFp).

BACKGROUND

In modern communication networks, at least part of the main functionality of a communication network, such as the transmission of data, and particular voice data and/or various other kinds of data, may be structured into and/or supported by so-called services. Such services may for instance comprise a support of authentication, security-related services, session management and/or aggregation of traffic from connected devices.

For instance, the 5G standard as defined by the 3rd Generation Partnership Project (3GPP), 3gppp.org, may in its 5G core (5GC) comprise a Service-Based Architecture (SBA) which comprises multiple services. A given service may be provided by a so-called network function (NF). An NF may access services of at least one other NF. Examples of NFs are a network exposure function (NEF), a network repository function (NRF), a policy control function (PCF), a unified data management (UDM). In some cases, an application function (AF) may be seen as a network function as well although it may not be a part of the SBA. Security should be ensured using such services. Thus, the application aims towards enhancing security of such services while limiting security-induced processing overhead.

SUMMARY OF SOME EXAMPLE EMBODIMENTS

A first NF, a so-called NF consumer (NFc) may wish to access a desired service from a second NF, a so-called NF producer (NFp). In order to assure the security, integrity and/or efficiency of the communication network, the NFc needs to be authorized to access the desired service at the NFp.

The NFc and the NFp may be part of a communication network. The communication network may further comprise at least one network manager. The network manager may be a mobile network entity that provides a package of end-user functions with the responsibility for the management of a network, for example according to clause 3.1 of 3GPP TS 32.101 V17.0.0. The communication network may further comprise at least one certification authority server (CA server).

For authorization of the NFc to access at least one service of an NFp, the NFc may for instance obtain an access token from a network repository function (NRF). The access token may subsequently be shared with the NFp when requesting a service from the NFp. The NFp may validate the access token. In case the validation is successful, the NFp may then serve the request of the NFc and provide a response to the NFc.

The access token may for instance be an OAuth 2.0 access token. OAuth 2.0 access token verification is relatively expensive computationally. As a consequence, the NFp consumes considerable computational resources for the purpose of validating access tokens of this kind. Additionally, public keys for validation of the access token(s) need to be preconfigured at the NFp. In particular, for frequent accesses, in particular by the NFc, at the NFp, the access token operations may become a bottleneck for the performance of the NFp. The access token operations may for instance comprise fetching the token, validating the token, such as decrypting at least one element of the token, caching information related to the token and/or combinations thereof.

Examples of cases in which access token validation may become a performance issue are a unified data management (UDM) entity accessing a user data repository (UDR), a policy control function (PCF) accessing a UDR, and access and mobility management function (AMF) accessing an unstructured data storage function (UDSF).

A network manager may disable OAuth 2.0 authorization, in particular if NFs are deployed on a same cluster. A cluster may be for instance a group of NFs operated in the same infrastructure. In particular, a cluster may be defined for virtual NFs operated on the same underlying hardware system. Still, transport layer security (TLS) is used for secure communication. But, TLS does not natively support authorization by itself.

Alternatively, static authorization may be used for validating the authorization of the NFc in accessing a service of the NFp. In static authorization, OAuth2.0 is not used. Instead, authorization policies are preconfigured, in particular at the level of the NFp. I.e., the communication network may configure at the NFp, which functions a given NFc may access. As such rules need to be stored for every potential NFc and for every service, processing rules set for this purpose may be complex and may thus cause processing delays as well. Additionally, a preconfiguration at the NFp is less flexible compared to an individual access token, provisioned along with a service request by the NFc, such as used in the case of OAuth2.0 authorization. Keeping (e.g. all) rules at (e.g. all) NFps up to date may become challenging for a high number of NFps, with the possibility of outdated rules becoming a security hazard.

According to embodiments of the disclosed subject matter, authorization, in particular authorization of the NFc at the NFp, may be based at least partially on a transport layer security enhancement (TLS enhancement). The enhancement may in particular relate to a certificate used in TLS for authentication purposes. The certificate may additionally serve an authorization purpose.

It is thus, inter alia, advantageous to enhance the security of NF services, for example by enabling the authorization of a network function by another network function in a manner which is computationally efficient and dynamically adjustable.

According to a first example aspect, an apparatus for a network function consumer (NFc) is proposed, the apparatus comprising

- means for obtaining a network function certificate, NF certificate; wherein
- the NF certificate is indicative of an identity of the NFc for authentication of the NFc by at least one network function producer, NFp; and
- the NF certificate comprises at least one information element of authorization information indicative of a service authorization specifying that the NFc is permitted to access at least one permitted service provided by at least one permitted NFp.

According to a further example aspect, an apparatus is disclosed, comprising at least one processor; and at least one memory storing instructions that, when executed by the at least one processor, cause the apparatus at least to perform and/or control the actions as disclosed to be performed by the means of the first example aspect.

According to a further example aspect, a computer program is disclosed, the computer program when executed by a processor causing an apparatus, for instance a server, to perform and/or control the actions as disclosed to be performed by the means of the first example aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further example aspect, an apparatus is disclosed, configured to perform and/or control or comprising respective means for performing and/or controlling the steps disclosed to be performed by the means of the first example aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

The apparatus according to the first example aspect comprises means for obtaining a network function certificate (NF certificate). For instance, the means may be configured to obtain a network certificate from another network entity, for instance another network function, a network manager, and/or a certification authority server. The means for obtaining a NF certificate may for instance comprise communication means. The communication means may be adapted to communicate with other network entities, in particular the ones listed above. The means for obtaining the NF certificates may for instance comprise means for establishing at least one communication link, in particular a communication link to another network entity.

The means for obtaining an NF certificate may for instance be configured to obtain more than one NF certificate. The means for obtaining an NF certificate may be configured to actively receive an NF certificate, in particular from another network entity. Additionally or alternatively, the means for obtaining may be configured to actively request and/or poll an NF certificate, in particular from a network entity.

An NF certificate, in particular the NF certificate obtained by using the means for obtaining an NF certificate, may be indicative of an identity of the NFc. The NF certificate is indicative of an identity of the NFc for authentication of the NFc by at least one NFp. To this end, the NF certificate may comprise a verifiable identification element. A verifiable identification element may for instance correspond to and/or comprise an encrypted element, which may have been encrypted by a secret key to which a public key may be (e.g. publicly) available. The encrypted element may be decryptable, e.g. by means of the public key. A successful decryption using the associated public-key may thus prove that the encrypted element has been encrypted using a secret key. The secret key may for instance belong to a trusted entity and/or to the NFc. The encrypted element of the NF certificate may for instance have been encrypted by a trusted party, in particular using a secret key owned by a trusted party, such as for example a certification authority. The certification authority may for instance be implemented in a certification authority server (CA server).

As the NF certificate is indicative of an identity of the NFc for authentication of the NFc by at least one NFp, it may be structured according to at least one validation means for authenticating the NFc which the NFp may comprise and/or have access to.

The NF certificate additionally comprises at least one information element of authorization information indicative of a service authorization. An information element of authorization information may in particular correspond to an entry within the NF certificate. The service authorization may specify that a given NFc is permitted to access at least one permitted service provided by at least one permitted NFp. By being indicative of the service authorization, the information element of authorization information comprised by the NF certificate may describe or represent, what services the NFc may access at which NFp. The NFc for which the service authorization specifies such access rights may in particular be the NFc of which its identity is indicated by the NF certificate.

The NF certificate may be specific to a single NFc. An NF certificate may alternatively indicate identities and/or service authorizations for at least two or more NFcs.

An access of the NFc onto a service of the NFp may for instance comprise availing to a service, using a service, obtaining the result of a given service, stopping a given service, starting a given service, interrupting a given service, forwarding a given service and/or combinations thereof. Accessing a given service may also for instance comprise requesting a piece of information from the NFp, a subscription to a service provided by the NFp, a transmission of a piece of information from the NFc via the NFp to another network entity, for instance another network function, an execution of a command transmitted from the NFc to the NFp, causing the NFp to execute an action as desired by the NFc, a grant of a permission to execute a network function by the NFc and/or combinations thereof.

The NF certificate may, by its construction, be un-corruptible. For instance, the integrity of the NF certificate may be verifiable by means of a hash value. A hash value of the NF certificate may be computed by means of a given hashing algorithm such as for instance the secure hashing algorithm (SHA), for instance SHA-1, SHA-2, SHA-3 as developed by the National Institute of Standards and Technology (NIST). At the same time a hash value may be obtained from a trusted source, such as for instance a certification authority, for instance from a CA server, in particular from the CA server that issued and/or constructed the NF certificate. If the computed hash value and the obtained hash value match, it can be deduced that the NF certificate has not been corrupted and/or amended.

It has thus been recognized that the NF certificate, which may be used for authentication purposes, i.e. for authenticating the identity of the NFc by the NFp, may additionally be used for authorization purposes. The NF certificate may be enhanced by at least one entry that describes or represents the authorization of an NFc, in particular the NFc for which the NF certificate fulfils the authentication purposes, to access services provided by at least one NFp. Because of the verifiable and un-corruptible nature of the NF certificate, the NFp may trust the authorization as specified by the NF certificate, and may thus allow a/the NFc to access the desired service provided by the NFp in case the authorization allows it. Because a respective NF certificate may anyway be used for authentication, (e.g. almost) no additional traffic on the communication network is caused by the proposed method. No additional computational verification has to be carried out for the authorization itself, additionally to the already required efforts to verify the identity of the NFc. At the same time, the authorization of NFcs within the communication network may be dynamically adapted and communicated to the NFp by means of NF certificates that are transferred anyway between the network functions.

According to an embodiment of the first example aspect, the apparatus may further comprise means for obtaining the NF certificate from a network manager.

The apparatus according to the first example aspect may further comprise means for obtaining the NF certificate from a network manager. Such further means for obtaining may for instance be comprised and/or correspond to the means for obtaining a network function certificate as disclosed above. Additionally or alternatively, the means for obtaining the NF certificate from a network manager may also comprise distinct means from the means for obtaining a network function certificate.

The means for obtaining the NF certificate from a network manager may in particular comprise communication means. The means for obtaining the NF certificate from a network manager may in particular be configured to establish a communication link to a network manager. The means may be configured to receive the NF certificate from the network manager which transmits the NF certificate. The means may additionally or alternatively be configured to (e.g. actively) collect the NF certificate, e.g. from the network manager. The means may be configured to obtain the certificate (e.g. directly) from the network manager and/or by means of at least one intermediary party, for example a certification authority, such as a certification authority server.

According to an embodiment of the first example aspect, the apparatus further comprises means for obtaining at least one service authorization detail indicative of the service authorization from a network manager;

means for transmitting a network function certificate request, NF certificate request, to a certification authority server, CA server, wherein the NF certificate request is indicative of the service authorization; and means for obtaining the NF certificate from the CA server.

The apparatus may thus further comprise means for obtaining at least one service authorization detail indicative of the service authorization from a network manager. Such means may thus serve the purpose of the network manager configuring the NFc with an authorization for accessing at least one permitted service at at least one permitted NFp. The service authorization detail may comprise and/or be accompanied by at least one verifiable (e.g. information) element. For instance, the verifiable element may correspond to and/or comprise an encrypted element that allows a verification by decrypting. As above, a means for obtaining, in particular the means for obtaining the at least one service authorization detail indicative of the service authorization from the network manager, may be configured to (e.g.) passively obtain the service authorization detail or may be configured to (e.g. actively) fetch the at least one service authorization detail from the network manager.

The apparatus may further comprise means for transmitting a network function certificate request (NF certificate request). The NF certificate request may be indicative of the service authorization. In particular, the NF certificate request may comprise at least one information element, or all information elements of the at least one service authorization detail. The means for transmitting may thus be configured to at least partially and/or entirely forward the obtained service authorization detail. Additionally alternatively, the means for transmitting may be configured to transmit a piece of information different from the service authorization detail, which may be nonetheless indicative of the service authorization. The means for transmitting may be configured to transmit the NF certificate request to a certification authority server (CA server). The means for transmitting may for instance be configured to construct a message as expected by the CA server. For instance, the CA server may expect a communication complying with a given protocol and/or the CA server may require a given format of a NF certificate request. The means for transmitting an NF certificate request may thus comprise means for constructing an NF certificate request Constructing may in this case comprise for instance generating, composing, combining parts of an NF certificate request, filling in a predefined form of an NF certificate request and/or combinations thereof. In particular, the means for transmitting may be configured to transmit the NF certificate request in response to the apparatus (of the first example aspect) obtaining the at least one authorization detail. The authorization detail and/or a message comprising the authorization detail may instruct the apparatus (of the first example aspect) to transmit the NF certificate request.

The NF certificate request may be indicative of an identity of an NFc, in particular an identity of the NFc transmitting the NF certificate request. The NF certificate request may for instance be indicative of an identity of an NFc for which the requested NF certificate is to be issued, in particular by the CA server.

The apparatus may further comprise means for obtaining the NF certificate from the CA server. The means for obtaining the NF certificate from the CA server may for instance be configured to obtain the NF certificate as a response to the NF certificate request previously transmitted by the apparatus to the CA server by using the means for transmitting an NF certificate request. The means for obtaining the NF certificate from the CA server may be different from previously disclosed means for obtaining. The means for obtaining the NF certificate from the CA server may at least partially be identical to previously disclosed means such as for example the means for obtaining at least one service authorization detail indicative of service authorization from a network manager and/or means for obtaining the NF certificate from a network manager and/or the means for obtaining an NF certificate. The means for obtaining may be configured to fetch the NF certificate from the CA server and/or may be configured to (e.g. passively) receive the certificate as transmitted from the CA server to the NFc.

According to an embodiment of the first example aspect, the NF certificate is at least partially or entirely constructed, e.g. by a CA server, The NF certificate may at least partially or entirely be constructed by a CA server, in particular by the CA server, from which the apparatus (of the first example aspect) obtains the NF certificate by using the means for obtaining the NF certificate from the CA server. The NF certificate may for instance have been constructed, generated, composed, combined from parts, filled-in to a predefined format and/or a combination thereof, e.g. by a and/or the CA server. For instance, the CA server may have constructed the NF certificate in response to having received an NF certificate request, in particular the NF certificate request transmitted by the apparatus using the means for transmitting the NF certificate request to a CA server.

The NF certificate may be constructed at least partially based on at least one certificate, such as a root certificate. For example, the NF certificate may constructed at least partially based on a configuration by a network manager. For example, the NF certificate may be constructed via a certification management protocol, in particular automatic, for instance via the certification management protocol version 2 (CMPv2).

According to an embodiment of the first example aspect, the service authorization is configured by a network manager.

The service authorization, in particular the service authorization as indicated by the at least one service authorization detail obtained using the means for obtaining the at least one service authorization detail and/or as indicated by the at least one information element of authorization information, may be configured by a network manager. The network manager may be a mobile network entity that provides a package of end-user functions with the responsibility for the management of a network, for example according to clause 3.1 of 3GPP TS 32.101 V17.0.0.

By configuring the service authorization, the network manager may manage the access rights and/or authorizations of at least one or multiple network functions within the communication network. In particular, a given network function may not be allowed to decide on its own, which services it may access or not. In particular, without the network manager authorizing a given network function to access a service of another network function, the given network function may not access the service. For example, no other network entity different from the network manager may be authorized to configure the service authorization of a given network function, in particular of the NFc.

The network manager may for instance inform the CA server of the service authorization of a given network function, in particular of the NFc. For instance, the network manager may transmit an indication of the service authorization to the CA server. Additionally or alternatively, the network manager may transmit an indication of the service authorization to a given network function, in particular to the NFc, in particular in the form of at least one service authorization detail indicative of the service authorization.

The at least one service authorization detail may be indicative of an NFc and/or an identity of an NFc, in particular at least one NFc for which the service authorization indicated by the at least one service authorization detail specifies access authorizations.

According to an embodiment of the first example aspect, the service authorization specifies at least one of the following:

one or more permitted services the NFc is allowed to access;

at least one NFp instance on which the NFc is allowed to access the at least one or more permitted services;

a type of NFp on which the NFc is allowed to access the at least one or more permitted services;

a duration during which and/or a time limit until which the NFc is allowed to access the at least one or more permitted services; or a number of times the NFc is allowed to access the at least one or more permitted services.

For instance, the service authorization may specify one or more permitted services which the NFc is allowed to access. For instance, the NFc may be allowed to access the one or more permitted services on at least one NFp. For instance, in the NFc may be allowed to access the one or more permitted services on any NFp.

For example, the service authorization may specify at least one NFp instance on which the NFc is allowed to access the at least one or more permitted services. An NFp instance may be one particular network entity providing an NFp and/or a logical, for instance virtualized, instance of an NFp.

For example, the service authorization may specify, for at least one or more NFp instances, the respective one or more permitted services which the NFc may be allowed to access. While the NFc may be able to access a given service on one particular NFp, the NFc may not be allowed to access this service on another NFp instance even though the NFc may be able to access different services on this another NFp instance.

The service authorization may for example specify the type of NFp on which the NFc is allowed to access the at least one or more permitted services. By specifying the type of NFp instead of a single NFp instance, on which the NFc is allowed to access a given service, the configuration of the access rights is simplified. For instance, a type of NFp may be a network exposure function (NEF), a network repository function (NRF), a policy control function (PCF), a unified data management (UDM) or an application function (AF).

The service authorization may comprise a time limit. For instance, the service authorization may specify a duration during which and/or a time limit until which the NFc is allowed to access the at least one or more permitted services. Different durations and/or time limits may be set for different services and/or for a different types or instances of NFps. For instance, one duration and/or time-limit may be set for a given type and/or instance of NFp while a different time limit and/or duration may be set for another type and/or instance of NFp. For example, one duration and/or time-limit is set for all NFps (e.g. one or more NFp types and/or -instances) and/or (e.g. all) services as specified by the service authorization.

The access to such one or more services by the NFc may alternatively or additionally be limited by the number of times the NFc is allowed to access the at least one or more permitted services. For instance the same number of allowed accesses may be specified for all services specified in the service authorization. Additionally or alternatively, different numbers of allowed individual accesses may be specified for different services and/or NFps (e.g. one or more NFp instances and/or -types).

According to an embodiment of the first example aspect, the NF certificate is an X.509 certificate and/or a transport layer security certificate, TLS certificate, comprising and/or being embedded with the at least one information element of authorization information.

The NF certificate may for instance be or be implemented as a X.509 certificate. X.509 is a standard by the International Telecommunication Union (ITU) and their telecommunication standardization sector (ITU-T). In its current form, the X.509 is for instance described in the ISO/IEC 9594-8 standard. The standard describes a public key infrastructure for generating, maintaining and/or validating digital certificates. In particular, X.509 certificates are used in transport layer security (TLS) protocols. One of the main functionalities of such an X.509 certificate is the ability of the recipient of the certificate to authenticate the certificate and thereby the identity of the sender. In particular, a recipient may be able to verify, that the certificate has been issued by a trusted authority. Such an authority may for instance be a certification authority, in particular a/the CA server.

A X.509 certificate may comprise at least one data field for carrying information elements. It has been recognized that it is therefore suitable to carry information that pertains to more than just authentication. It has in particular been recognized, as detailed above, that a certificate, in particular a X.509 certificate, may be used to carry information pertaining to service authorization, such as at least one information element of authorization information indicative of a service authorization. Typically, for such an X.509 certificate, a hash value (so-called thumbprint), is computed for the entire certificate including the at least one data field. Using such a hash value, the integrity of the certificate and thus of any authorization information comprised by the at least one data field may be verified. The service authorization indicated by an entry within the NF certificate can thus be trusted as well.

The NF certificate may additionally or alternatively be implemented as a transport layer security certificate (TLS certificate).

The NF certificate may comprise and/or be embedded with at least one information element of authorization information. For example, a data field of the NF certificate, I particular the X.509 certificate or the TLS certificate, may carry information about the service authorization. In particular, the data field may comprise at least one information element of authorization information indicative of a service authorization. The field may for instance be a subject alternative name (SAN) field. Multiple information elements of authorization information may be comprised by the NF certificate.

According to an embodiment of the first example aspect, the apparatus further comprises

- means for transmitting a network function service request, NF service request, to an NFp, wherein
- the NF service request comprises the NF certificate; and
- the NF service request is indicative of at least one desired service provided by the NFp.

The apparatus may thus comprise means for transmitting a network function service request (NF service request) to an NFp. Such means for transmitting may for instance comprise and/or correspond to communication means. The means for transmitting the NF service request may for instance be configured to establish at least one communication link to at least one NFp.

The NF service request, in particular the NF service request submitted by the apparatus by using the means for transmitting an NF service request, comprises the NF certificate. The NF certificate may have been thus previously be obtained by using the means of the apparatus for obtaining and NF certificate, in particular from a network manager and/or from a/the CA server, in particular from a/the CA server having previously constructed (or the like) the NF certificate. Then, this obtained NF certificate is transmitted by the apparatus using the means for transmitting an NF service request as part of the NF service request, to an NFp. The NF certificate comprises the information element of authorization information indicative of a service authorization.

The NF certificate and the NF service request may be transmitted by the means for transmitting in the same step. Additionally or alternatively, the NF service request and the NF certificate may be transmitted using the means for transmitting in two separate steps. The NFc may for instance transmit an NF service request comprising the NF certificate in a first step. Subsequently the NFc may transmit, by using the means for transmitting, a second and/or multiple subsequent NF service requests without the respective service request(s) comprising an NF certificate. This may reduce traffic. For example, the NFc may (e.g. only) send the NF certificate together with the NF service request, after the NFc has obtained, in particular using the means for obtaining and NF certificate, and NF certificate. I.e., once the NF certificate has changed and/or been updated and with it the service authorization indicated by the at least one information element of authorization information of the NF certificate, the NF certificate may be transmitted to the NFp. Additionally alternatively, the NFc may transmit the NF certificate along with any transmitted NF service request.

The NF service request is indicative of at least one desired service provided by the NFp. The apparatus thus may request, by means of the NF service request, at least one desired service from the NFp. The NFc may thus attempt to access at least one service of the NFp by transmitting the NF service request.

According to an embodiment of the first example aspect,

- the NF service request is transmitted via mutual transport layer security protocol.

Mutual transport layer security protocol (mTLS) is a communication protocol that typically involves the use of at least one or two certificates, in particular for authentication of the communicating parties towards one another. Such certificates may, as disclosed above, additionally serve the purpose of authorizing at least a first party to access a service of the respective other communicating party. The first party may here be the NFc and the other communicating party may for instance be the NFp.

It is thus one of the disclosed ideas, that an authorization of the NFc may be achieved by an enhancement of the mTLS communication between the NFc and the NFp. Such an enhancement may in particular be achieved by including at least one information element of authorization information indicative of a service authorization in an certificate, in particular the NF certificate, in particular a X.509 certificate that is used for authentication within the mTLS communication protocol.

According to an embodiment of the first example aspect, the apparatus further comprises

- means for obtaining a service response from the NFp.

The apparatus may comprise means for obtaining a service response from the NFp. Such a service response may for instance be transmitted by the NFp to the NFc. In particular, such a service response may be obtained by the means for obtaining a service response, after the NFc has transmitted a NF service request. The service response may thus be based on and/or be dependent on the NF service request previously transmitted by the NFc to the NFp. Additionally or alternatively, the service response may be based on and/or be dependent on the NF certificate previously transmitted by the NFc to the NFp, in particular as part of and/or additionally to the NF service request. For instance, the service response may at least partially depend on the at least one information element of authorization information indicative of service authorization comprised by the NF certificate previously transmitted to the NFp.

For example, the NF service request may comprise a positive response to the NF service request such as for example an acknowledgment and/or an expected and/or desired return value, in particular such as a return value expected by the NFc, if the NFc is authorized to access the respective service at the NFp according to the service authorization. If, however, the service authorization does not specify that the NFc is authorized to access the desired service at the desired NFp, the service response may be negative. For instance the service response may in this case corresponds to an error code and/or an access denied message. Alternatively, the NFp may not transmit a service response to the NFc at all in this case.

According to an embodiment of the first example aspect, the apparatus comprises the NFc, is the NFc, or is comprised in the NFc.

The NFc may for instance be implemented as a virtualized network function (VNF), in particular comprising one or more virtual machines (VMs) that are for instance running on a virtualization platform comprising one or more virtualization servers. In this case, the apparatus may be a virtualization server that comprises the NFc. The NFc may additionally or alternatively be implemented as a network element, or as a part of a network element. In this case, the apparatus may be or may comprise the NFc. Alternatively or additionally, the apparatus may be implemented as a chip and/or a module comprised in a network element that is the NFc or comprises the NFc. In this case, the apparatus may be comprised in the NFc. Alternatively or additionally, the apparatus may be implemented as a chip and/or a module comprised in a virtualization server running the NFc as a VNF. In this case, the apparatus may be comprised in the NFc.

The features as disclosed for the first example aspect are at the same time disclosed for the second, third and fourth example aspect which are disclosed in the following.

According to a second example aspects of the disclosed subject matter, and apparatus for a network function producer, NFp, is proposed, comprising:

- means for validating a network function certificate, NF certificate, wherein
  - the NF certificate is indicative of an identity of a network function consumer, NFc, for authentication of the NFc by least one NFp; and
  - the NF certificate comprises at least one information element of authorization information indicative of a service authorization specifying that the NFc is permitted to access at least one permitted service provided by at least one permitted NFp.

According to a further example aspect, an apparatus is disclosed, comprising at least one processor; and at least one memory storing instructions that, when executed by the at least one processor, cause the apparatus at least to perform and/or control the actions as disclosed to be performed by the means of the second example aspect.

According to a further example aspect, a computer program is disclosed, the computer program when executed by a processor causing an apparatus, for instance a server, to perform and/or control the actions as disclosed to be performed by the means of the second example aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further example aspect, an apparatus is disclosed, configured to perform and/or control or comprising respective means for performing and/or controlling the steps disclosed to be performed by the means of the second example aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

The apparatus according to the second example aspect comprises means for validating a network function certificate (NF certificate). Such an NF certificate may for example have been obtained by the NFp from an NFc. The NF certificate may in particular at least partially or entirely possess the properties, features or characteristics as described above for the NF certificate transmitted by an NFc to the NFp in example embodiments of the first example aspect. In short, the certificate may be indicative of an identity of an NFc. Additionally, the NF certificate may comprise at least one information element of authorization information indicative of a service authorization. Thus, the NF certificate may be seen as an enhanced authentication certificate, in particular a TLS and/or X.509 certificate.

The means for validating may be configured to authenticate and/or assess an authorization of at least one NFc, in particular be based on the NF certificate, in particular on an NFc from which the NF certificate has been obtained by the NFp. The means for validating may for instance comprise at least one decryption and/or encryption means. The means for validating may be configured to process the NF certificate and authenticate an NFc as indicated by the NF certificate, i.e. decide whether the NFc may be trusted, and/or decide whether the NFc is authorized to access at least one service provided by the NFp, in particular a service that may be requested by the NFc from the NFp.

According to an embodiment of the second example aspect, the apparatus further comprises

- means for obtaining a network function service request, NF service request, from an NFc indicative of at least one desired service provided by the NFp, wherein the NF certificate to be validated is comprised by the NF service request.

The apparatus may comprise means for obtaining an NF service request. In particular, the means for obtaining an NF service request may be configured to obtain the NF service request from an NFc. The service request may in particular be indicative of at least one desired service provided by the NFp. Thus the means for obtaining the NF service request may enable the NFp to obtain at least one service request from another network function, in particular from an NFc. The NF certificate to be validated, i.e. the certificate that is validated using the means for validating a network function certificate, may be obtained as part of and/or accompanied and/or comprised by the obtained service request. The means for obtaining may for example work in conjunction with the means for validating an NF certificate. For example, the NF service request may be obtained using the means for obtaining it, and subsequently, the means for validating are used to validate the NF certificate comprised in the NF service request.

According to an embodiment of the second example aspect, the means for validating comprise at least one of:

means for authenticating the NFc based on the NF certificate; or means for evaluating if the NFc is permitted to access at least one of the at least one desired services of the NFp.

The means for validating the NF certificate may comprise means for authenticating the NFc based on the NF certificate. As the NF certificate is indicative of an identity of the NFc, the means for authenticating may be configured to authenticate the NFc, in particular verify the identity of the NFc, based on the NF certificate. This may be achieved by verifying an origin of the NF certificate, for instance by decrypting an encrypted element in the NF certificate using a public key of a trusted entity such as for example a CA server. Additionally or alternatively, a hash value of the certificate may be determined or computed, for instance to verify integrity of the certificate.

Additionally or alternatively, the means for validating the NF certificate may comprise means for evaluating if the NFc is permitted to access at least one of the at least one desired services of the NFp. The desired services are indicated by the NF service request obtained by the NFp using the means for obtaining an NF service request. The NF certificate may indicate, for instance by at least one information element of authorization information indicative of authorization information, at least one permitted service for at least one permitted NFp. Using the means for evaluating, the NFp may decide, whether the NFp shall grant the NFc access to a requested service as is or whether the NFp should rather deny access. For instance, it may check whether the NFp itself is listed as a permitted NFp within the at least one information element and if this is the case, the NFp may further search, within the permitted services, for the requested service. If the requested service is among the permitted services, the NFp may decide that the NFc is allowed/authorized to access the requested service.

According to an embodiment of the second example aspect, the apparatus further comprises:

means for transmitting a service response to the NFc, wherein at least a part of the service response depends on a result of the validating.

The apparatus may thus further comprise means for transmitting a service response to the NFc. The NFc in this case is the NFc, that previously transmitted and NF service request to the NFp e.g. indicating at least one desired service that the NFc wishes to access on or which is provided by the NFp. The means for transmitting a service response to the NFc may comprise communication means. In particular, the service response transmitted by the means for transmitting, may at least partially depend on a result of the validating of the NF certificate using the means for validating. For instance, the service response may be negative in case the validating yields the result, that the NFc cannot be authenticated and/or the NFc is not allowed to access a given service. Alternatively, the service response may be positive in case the evaluating yields the result that the NFc authenticated and is allowed to access at least one of the desired services it desires to access on the NFp.

According to an embodiment of the second example aspect, the apparatus comprises the NFp, is the NFp, or is comprised in the NFp.

The NFp may for instance be implemented as a virtualized network function (VNF), in particular comprising one or more virtual machines (VMs) that are for instance running on a virtualization platform comprising one or more virtualization servers. In this case, the apparatus may be a virtualization server that comprises the NFp. The NFp may additionally or alternatively be implemented as a network element, or as a part of a network element. In this case, the apparatus may be or may comprise the NFp. Alternatively or additionally, the NFp may be implemented as a chip and/or as a module comprised in a network element. In this case, the apparatus is comprised by the NFp. Alternatively or additionally, the apparatus may be implemented as a chip and/or a module comprised in a network element that is the NFp or comprises the NFp. In this case, the apparatus may be comprised in the NFp. Alternatively or additionally, the apparatus may be implemented as a chip and/or a module comprised in a virtualization server running the NFp as a VNF. In this case, the apparatus may be comprised in the NFp.

According to a third example aspect of the disclosed subject matter, and apparatus for a network manager is proposed, the apparatus comprising means for transmitting a network function certificate request, NF certificate request, to at least one of a certification authority server, CA server, or a network function consumer, NFc; wherein the NF certificate request is indicative of a service authorization specifying that the NFc is permitted to access at least one permitted service provided by at least one permitted network function producer, NFp.

According to a further example aspect, an apparatus is disclosed, comprising at least one processor; and at least one memory storing instructions that, when executed by the at least one processor, cause the apparatus at least to perform and/or control the actions as disclosed to be performed by the means of the third example aspect.

According to a further example aspect, a computer program is disclosed, the computer program when executed by a processor causing an apparatus, for instance a server, to perform and/or control the actions as disclosed to be performed by the means of the third example aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc or a Universal Serial Bus (USB) memory stick.

According to a further example aspect, an apparatus is disclosed, configured to perform and/or control or comprising respective means for performing and/or controlling the steps disclosed to be performed by the means of the third example aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

The apparatus may thus comprise means for transmitting a network function certificate request (NF certificate request). The means for transmitting are for instance configured to transmit the NF certificate request to a certification authority server (CA server). The means for transmitting may for instance be configured to construct a message as expected by the CA server. For instance, the CA server may expect a communication complying with a given protocol and/or the CA server may require a given format of a NF certificate request. The means for transmitting an NF certificate request may thus comprise means for constructing an NF certificate request. Constructing may in this case comprise for instance generating, composing, combining parts of an NF certificate request, filling in a predefined form of an NF certificate request and/or a combination thereof.

The NF certificate request may be indicative of an identity of an NFc (e.g. apparatus of the first example aspect), in particular an identity of an NFc for which the requested NF certificate is to be issued, in particular by the CA server.

The means for transmitting a network function certificate request may additionally or alternatively be configured to transmit an NF certificate request to an NFc.

The NF certificate request may be indicative of a service authorization. The service authorization may, as disclosed above for the first and/or the second example aspect specify, for a given NFc and/or for more than one NFc what services the NFc may access on what NFp. In particular, the NF certificate request may comprise at least one service authorization detail. The service authorization detail, may at least partially or entirely have the properties, features, and/or characteristics as disclosed above for the first and/or second aspect. The service authorization detail may in particular indicate at least one NFc and be indicative of a service authorization. The means for transmitting may in particular be configured to at least partially and/or entirely forward an obtained service authorization detail to the CA server and/or to the NFc. Additionally or alternatively, the means for transmitting may be configured to transmit a piece of information different from the service authorization detail, which is nonetheless indicative of the service authorization.

When transmitting the NF certificate request to the NFc, the NF certificate request may comprise at least one command directed to the NFc ordering it to transmit a and/or forward the CF certificate request to the CA server.

According to an example embodiment of the third example aspect, the apparatus further comprises

- means for obtaining a network function certificate, NF certificate, from the CA server, wherein
  - the NF certificate is indicative of an identity of the NFc for authentication of the NFc by at least one NFp; and
  - the NF certificate comprises at least one information element of authorization information indicative of the service authorization; and
- means for transmitting the NF certificate to the NFc.

The apparatus may further comprise means for obtaining an NF certificate from the CA server. In particular, the network manager may obtain the NF certificate from the CA server after having transmitted an NF certificate request to the CA server.

The NF certificate in particular has the properties, features, and/or characteristics as disclosed above within the disclosure relating to a first and/or the second example aspect of the subject matter.

The apparatus may further comprise means for transmitting the NF certificate, in particular the NF certificate as received from the CA server, to the NFc. The means for transmitting may be configured to forward the NF certificate as obtained from the CA server to the NFc, for instance essentially immediately after having obtained the NF certificate.

According to an embodiment, the apparatus comprises the network manager, is the network manager, or is comprised in the network manager.

The network manager may for instance be implemented as a virtualized network entity, in particular comprising one or more virtual machines (VMs) that are for instance running on a virtualization platform comprising one or more virtualization servers. In this case, the apparatus may be a virtualization server that comprises the network manager. The network manager may additionally or alternatively be implemented as a network element, or as part of a network element. Alternatively or additionally, the apparatus may be implemented as a chip and/or a module comprised in a network element that is the network manager or comprises the network manager. In this case, the apparatus may be comprised in the network manager. Alternatively or additionally, the apparatus may be implemented as a chip and/or a module comprised in a virtualization server running the network manager as a virtualized network entity. In this case, the apparatus may be comprised in the network manager.

According to a fourth example aspect of the disclosed subject matter, a certification authority server (CA server) is disclosed, the CA server comprising

- means for obtaining a network function certificate request, NF certificate request, from a network manager and/or from a network function consumer, NFc, wherein the NF certificate request is indicative of a service authorization specifying that the NFc is permitted to access at least one permitted service provided by at least one permitted network function producer, NFp; and
- means for constructing a network function certificate, NF certificate, wherein
  - the NF certificate is indicative of an identity of the NFc for authentication of the NFc by least one NFp; and the NF certificate comprises at least one information element of authorization information indicative of the service authorization; and means for transmitting the NF certificate to at least one of: the network manager, or the NFc.

According to a further example aspect, an apparatus is disclosed, comprising at least one processor; and at least one memory storing instructions that, when executed by the at least one processor, cause the apparatus at least to perform and/or control the actions as disclosed to be performed by the means of the fourth example aspect.

According to a further example aspect, a computer program is disclosed, the computer program when executed by a processor causing an apparatus, for instance a server, to perform and/or control the actions as disclosed to be performed by the means of the fourth example aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further example aspect, an apparatus is disclosed, configured to perform and/or control or comprising respective means for performing and/or controlling the steps disclosed to be performed by the means of the fourth example aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

The means for obtaining an NF certificate request may be configured to obtain such request, for example via a communication link to an entity transferring such a NF certificate request. For example, the means for obtaining an NF certificate request may be configured to obtain, from a network manager and/or from a NFc (e.g. of the first example aspect), the NF certificate request. The NF certificate request is indicative of a service authorization. The service authorization does, just as in the previous aspects of the subject matter, specify permitted services at permitted NFps for a given NFc. The properties of the service authorization as disclosed in the other example aspects are also valid for the fourth example aspect. The NFc for which the service authorization specifies such service access authorizations may for instance be the NFc, from which the CA server obtains the NF certificate request. The service authorization may for instance be indicated by at least one authorization detail, which may particularly comprised by the NF certificate request.

The NF certificate request may for instance be indicative of an identity of at least one NFc, in particular of the NFc, from which it obtains the CF certificate request. The CA server may for instance verify an identity of the network manager and/or of the NFc, from which it obtains the CF certificate request.

The CA server may further comprise means for constructing an NF certificate. Constructing an NF certificate may for instance comprise filling in or building a predefined data structure, for example a form and/or a predefined certificate format such as an X.509 or TLS certificate. Constructing may for example additionally or alternatively comprise generating, composing, combining from parts, copying, ordering from another network entity and/or combinations thereof.

The CA server may further comprise means for transmitting the NF certificate to at least one of the network manager or the NFc. In particular, the CA server may thus obtain a NF certificate request from a requesting entity, construct a NF certificate and return the NF certificate to the requesting entity.

According to an embodiment of the fourth example aspect, the apparatus comprises the CA server, is the CA server, or is comprised in the CA server.

The CA server may for instance be implemented as a virtualized network entity, in particular comprising one or more virtual machines (VMs) that are for instance running on a virtualization platform comprising one or more virtualization servers. In this case, the apparatus may be a virtualization server that comprises the CA server. The network manager may additionally or alternatively be implemented as a network element, or as part of a network element. In this case, the apparatus may be or may comprise the CA server. Alternatively or additionally, the apparatus may be implemented as a chip and/or a module comprised in a network element that is the CA server or comprises the CA server. In this case, the apparatus may be comprised in the CA server. Alternatively or additionally, the apparatus may be implemented as a chip and/or a module comprised in a virtualization server running the CA server as a virtualized network entity. In this case, the apparatus may be comprised in the CA server.

LIST OF ABBREVIATIONS

NF network function
NFp network function producer
NFc network function consumer
NEF network exposure function
NRF network repository function
AF application function
TLS transport layer security
UDM unified data management
UDR user data repository
PCF policy control function
AMF access and mobility management function
UDSF unstructured data storage function
5GC 5G core
SBA service-based architecture

BRIEF DESCRIPTION OF THE DRAWINGS

In the figures show:

FIG. 5 an example certificate structure according to all example aspects;

DETAILED DESCRIPTION OF SOME EXAMPLE EMBODIMENTS

The following description serves to deepen the understanding and shall be understood to complement and be read together with the description as provided in the above summary section of this specification.

Embodiments shown in at least one of the figures and their description may be combined with any of the example aspects and their example embodiments described above.

Figure 1:
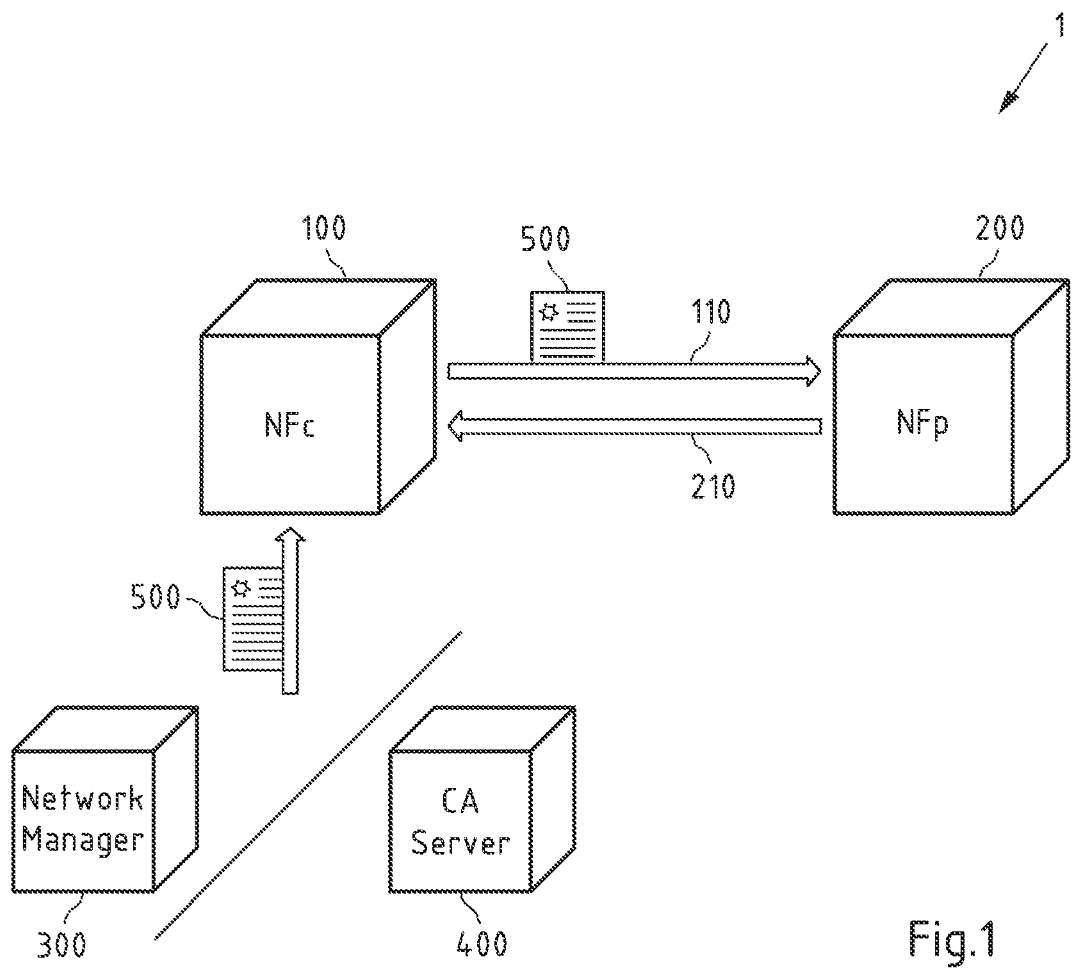
FIG. 1 a schematic diagram of an interaction between a network function consumer and a network function provider.

FIG. 1 shows a schematic view of a part of a communication network 1. In particular, FIG. 1 shows an interaction between a network function consumer (NFc) 100 (e.g. apparatus of the first example aspect) and a network function producer (NFp) 200 (e.g. apparatus of the second example aspect). The NFc transmits a service request 100 to the NFp. The service request 110 comprises a network function certificate (NF certificate) 500. The service request 100 may be indicative of at least one desired service that the NFc 100 wants to access and which is provided by the NFp 200. The NFp 200 may validate the NF certificate 500. In particular, the NFp 200 may evaluate, whether the NFc 100 is authorized to access at least one service provided by the NFp 200. The NFp 200 sends a service response 210 to the NFc. The service response may at least partially depend on a validation of the service request 110 and/or a validation of the certificate 500. If the NFp 200 comes to the conclusion that the NFc 100 is authorized to access the desired service, the service response 210 may be positive and/or comprise the requested functionality and/or correspond to the desired service.

FIG. 1 further shows a network manager 300 (e.g. apparatus of the third example aspect). The network manager 300 configures at least one entity within the communication network 1. FIG. 1 further displays a certification authority server (CA server) 400 (e.g. apparatus of the fourth example aspect). The NFc 100 may obtain the NF certificate 500 from the network manager 300 and/or from the CA server 400.

Figure 2:
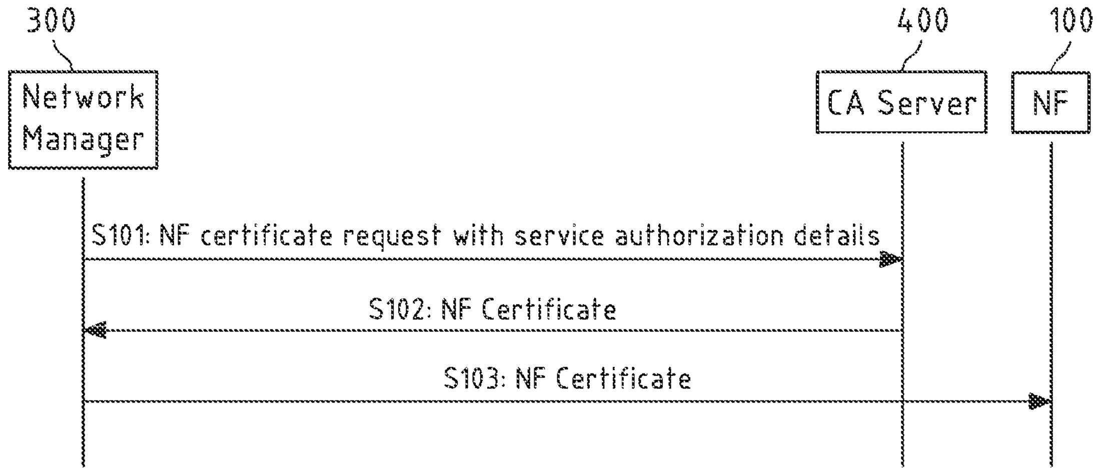
FIG. 2 a signaling diagram of a network function consumer, a network manager and a certification authority server according to the first, the third and the fourth example aspects.

In FIG. 2, a signaling diagram can be seen. The signaling diagram shows an interaction between an network manager 300 (e.g. apparatus of the third example aspect), a CA server 400 (e.g. apparatus of the fourth example aspect) and a network function 100. The network function 100 may in particular be a network function consumer (NFc) 100 (e.g. apparatus of the first example aspect).

In a step S101, the network manager 300 transmits a NF certificate request 500 to the certification authority server (CA server) 400. The NF certificate 500 request may in particular relate to an NF certificate 500 comprising at least one service authorization detail. The service authorization detail may be indicative of a service authorization describing permitted services that a given NFc 100 may access at a given (e.g. permitted) NFp and/or a group of permitted NFps. The NF certificate 500 may be specific to one NFc. The NF certificate request may comprise a request for one particular NF certificate and/or for multiple NF certificates. The CA server 400 may thus obtain an NF certificate request from the network manager 300.

In step S102, the CA server 400 may transmit a requested NF certificate 500 to the network manager 300. For example, the CA server 400 may construct the CF certificate 500, in particular based on the NF certificate request, prior to transmitting the NF certificate to the network manager 300. The network manager 300 may thus obtain the NF certificate 500 from the CA server 400.

The NF certificate 500 may be indicative of a service authorization. The service authorization may specify one or more services that may be accessed at one or more NFp. The service authorization may in particular specify such authorizations for one particular NFc. Additionally or alternatively, the authorization information may specify such authorizations for two or more NFc.

The network manager 300 may, in step S103, transmit the NF certificate 500 to the NF, in particular the NFc 100. The network manager 300 may install the NF certificates 500 on the NFc 100. For instance, by transmitting the NF certificate 500 to the NFc 100, an automated procedure of configuring the NFc 100 with the NF certificate 500 may be triggered.

The NFc 100 thus obtains the NF certificate 500 from the network manager 300. The NFc 100 may thereby be configured to use the NF certificate 500 when requesting a service from a certain NFp 200, for instance from NFp 204, with a service authorization comprised by the certificate 500.

Figure 3:
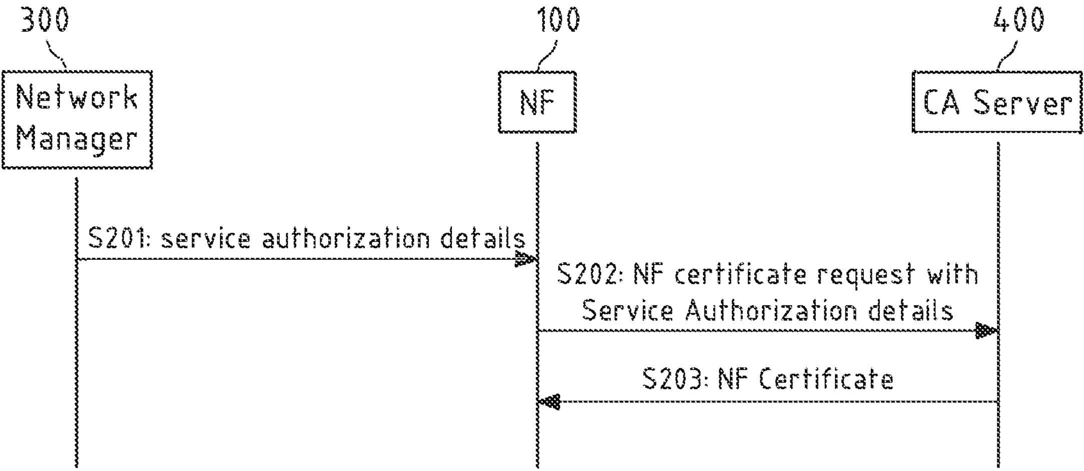
FIG. 3 a signaling diagram of a network function consumer, an network manager and a certification authority server according to the first, the third and the fourth example aspects.

FIG. 3 shows a similar signaling diagram to FIG. 2. In the signaling shown in FIG. 2, the network manager 300 (e.g. apparatus of the third example aspect) directly requests and NF certificate 500 from the CA server 400 (e.g. apparatus of the fourth example aspect) in an NF certificate request. In FIG. 3, on the other hand, the network manager 300 configures the network function 100 in the first step S201. The service authorization details, which are indicative of a service authorization, are thus transferred to the NF 100. Again, the NF 100 may be an NFc (e.g. apparatus according to the first example aspect). The NFc 100 may thus obtain service authorization details from the network manager 300 in step 201.

In step 202, the NF 100 may transmit an NF certificate request to the CA server 400. The NF certificate request may as well comprise the service authorization details. The NF certificate request transmitted in step 202 may in particular be indicative of a service authorization. In particular, the service authorization details, which may be comprised by the NF certificate request, may be indicative of the service authorization. The CA server 400 may thus obtain an NF certificate request from the network function 100.

The CA server 400 transmits an NF certificate 500 to the NFc 100 in step S203. The CA server 400 may particular construct the NF certificate 500, in particular based on the NF certificate request received from the NFc 100 and step 202. The NF certificate 500 may be indicative of a service authorization, in particular a service authorization of the NFc 100. The NF 100 may thus obtain an NF certificate 500 from the CA server 400 and step as 203.

Figure 4:
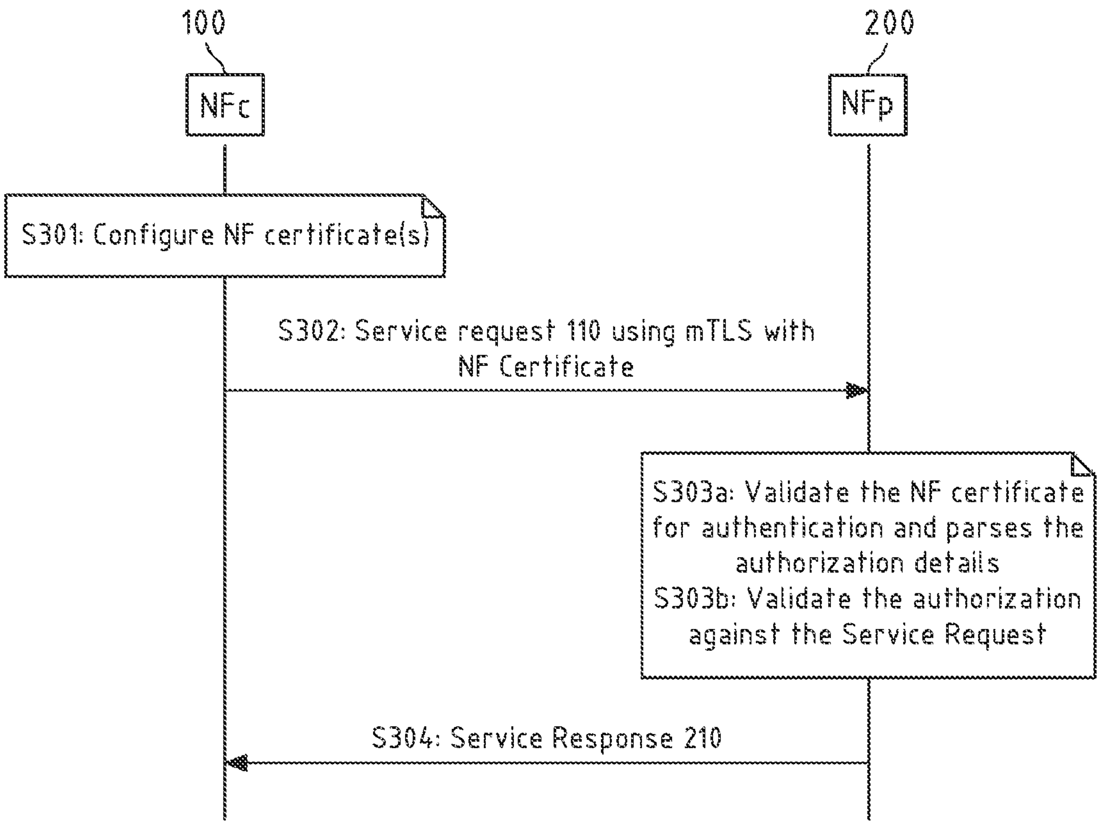
FIG. 4 a signaling diagram of a network function consumer and a network function producer according to the first and the second example aspects.

FIG. 4 shows a signaling diagram between a NFc 100 (e.g. apparatus according to the first example aspect) and NFp 200 (e.g. apparatus of the second example aspect).

The NFc 100 is, in step S301 configured with an NFc certificate 500. The NF certificate 500 may for instance have been obtained from a CA server 400 (e.g. apparatus of the fourth example aspect) or from an network manager 300 (e.g. apparatus of the third example aspect). The NF certificate 500 is in particular indicative of a service authorization. For instance, the NF certificate 500 may be indicative of authorization details provided by an network manager 300. The NFc 100 may be configured with more than one NF certificate 500, particular two or more NF certificates 500.

In step S302, the NFc transmits a service request 110 to the NFp 200. In particular, the NFc 100 may transmitted the service request 110 using TLS, in particular mTLS. The service request 110 transmitted by the NFc 100 to the NFp 200 may comprise an NF certificates 500. The service request 110 may further be indicative of at least one desired service that the NFc 100 desires to access on the NFp 200. The NFp 200 may thus obtain a service request 110 from the NFc 100 comprising an NF certificate 500.

In step S303, the NFp 200 validates the NF certificate 500. As part of the validation, the NFp 200 may, in step S303*a*, authenticate the NFc 100 based on the NF certificate 500. In particular the NF certificate 500 be indicative of an identity of the NFc 100. The certificate 500 may further comprise at least one verifiable element, which allows to derive that the identity indicated by the NF certificate 500 is the true identity of the NFc 100. For instance, the NF certificate 500 may comprise an element encrypted with a secret key of the NFc 100 or of another identity, such as for instance of the CA server 400. The NFp 200 may then use a public key of the NFc 100, in particular the public key corresponding to the secret key, to decrypt the encrypted element and thus derive that the certificate 500 is valid.

As part of the validation in step S303, the NFp 200 may validate, that the NFc 100 is authorized to access the requested service.

In step S304, the NFp 200 transmits a service response 210 to the NFc 100, in response to the service request 110. The service response 210 is a particular dependent on the service request 110. In particular, the service response 210 depends on the validation step S303. If the NFp 200 comes to the conclusion, in the validation step S303, that the NFc 100 is authorized to access at least one of the desired services indicated by the service request 110, the NFp 200 may send a positive service response 210 with regard to the at least one permitted service. If none of the desired services indicated in the service request 110 are permitted for the NFc on the NFp 200, the NFp 200 may transmit a negative service response 210 in step S304. The NFp 200 may thus deny service to the NFc 100, in case the permitted services indicated by the NF certificate 500 do not overlap with the desired services indicated in the service request 110.

FIG. 5 illustrates an example enhancement of an NF certificate 500 according to an embodiment as usable by all example aspects. In the last line, the NF certificate 500 comprises information about service authorizations of a given NFc 100 (e.g. apparatus of the first example aspect). The NF certificate 500 may for instance, as shown, use the subjectAltName (SAN) field of a NF TLS certificate to achieve the authorization for NFc 100 in SBA of 5GC. The use of the SAN field is specified in Table 6.1.3c.3-1 of TS 33.310 "Network Domain Security (NDS); Authentication Framework (AF) (Release 17)". Itis thus proposed that the subjectAltName may contain an authorization string comprising one or more information elements of authorization information. Such an authorization string may for instance be structured similarly to the following examples.

<Service access List>Service1, Service2<NFType>NFp

<Service access List>Service1<Validity time>10/12/2022 12:30:34<NF Instance Id list>124-54667-767678-23345

<Service access List>Service1<NFpInstance Id>124-54667-767678<Count>100

<Service access List>Service1, Service2<NF Instance Id list>124-54667-767678-23345,254-54667-765678-34534

FIGS. 10 to 13 show functional blocks into which the NFc 100 (e.g. apparatus according to the first example aspect), the NFp 200 (e.g. apparatus of the second example aspect) the network manager 300 (e.g. apparatus of the third example aspect) and/or the CA server 400 (e.g. apparatus of the fourth example aspect) may be structured. The shown functional blocks of the different entities may at least partially be virtual components. A virtual component may for instance be implemented in a distributed way across multiple information processing units. Thus, the respective components do not need to be physically separate from one another, but may in particular only be logically separated as functional units. The respective apparatuses (NFc 100, NFp 200, network network manager 300, CA server 400) may for instance be implemented as a virtualized apparatus comprising one or more virtual machines (VMs) running on a virtualization platform, as a network element, or the respective apparatus is implemented as a chip/module comprised in a network element.

Figure 6:
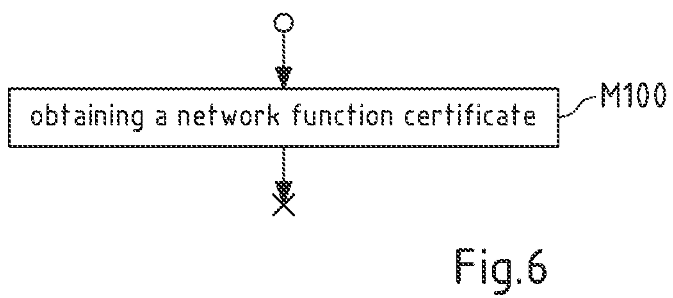
FIG. 6 a flowchart showing a method according to the first example aspect.

FIG. 6 shows a flowchart of the steps executed by an NFc 100 (e.g. apparatus of the first example aspect) according to the first example aspect. The NFc is configured to, in step M100, obtaining a network function certificate (NF certificate) 500. The NF certificate 500 may be indicative of an identity of the NFc 100. For instance, the NF certificate 500 may comprise a verifiable information element relating to the identity of the NFc 100. I.e., an entity, to which the NFc 100 transmits the NF certificate 500 may verify the identity of the NFc 100 as a sender of the certificate 500. The NF certificate may as well comprise at least one information element of authorization information indicative of a service authorization. The NFc 100 may thus be equipped to request services from other network functions, for example from at least one NFp, based on the service authorization indicated by the NF certificate 500.

Figure 7:
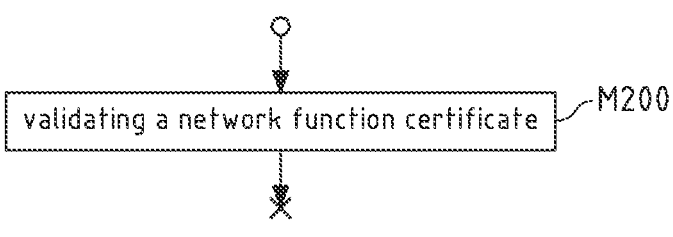
FIG. 7 a flowchart showing a method according to the second example aspect.

FIG. 7 shows a flowchart of the steps executed by an NFp 200 according to an embodiment of the second example aspect. The NFp 200 may, as shown, execute at least step M200 and validate a network function certificate (NF certificate) 500. As part of this validation, the NFp 200 may authenticate the NFc 100, in particular based on the NF certificate 500. Additionally, the NFp 200 may, based on the service authorization indicated by the NF certificate 500, decide, whether the NFc 100 (e.g. apparatus of the first example aspect) is authorized to access at least one desired services that the NFc 100 wishes to access as the NFp 200.

Figure 8:
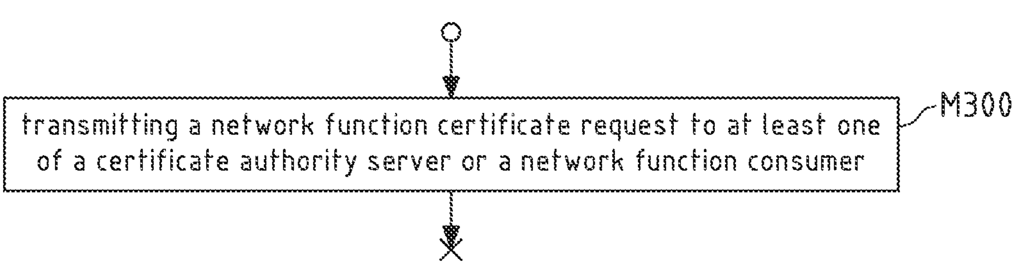
FIG. 8 a flowchart showing a method according to the third example aspect.

FIG. 8 illustrates a flowchart of the steps executed by a network manager 300 according to an embodiment of the third example aspect. The network manager 300 is configured to, in step M300, transmitting a network function certificate request to at least one of a certification authority server or a network function consumer. The network manager 300 may for instance include at least one authorization detail in the NF certificate request Doing so, the network manager 300 is capable of managing the service authorization of at least one or more NFcs 100 (e.g. apparatus of the first example aspect).

Figure 9:
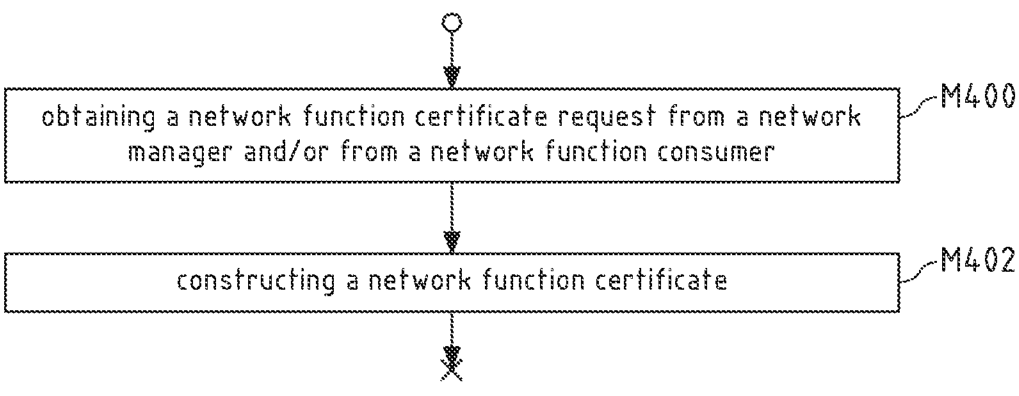
FIG. 9 a flowchart showing a method according all of the example aspects.

In FIG. 9, a flowchart shows steps executed by a certification authority server 400 (CA server), according to an embodiment of the fourth example aspect. These CA server 400 may be configured to, in step M400, obtaining a network functions difficult request. For instance, the network functions certificate request may be obtained from a network manager 300 (e.g. apparatus of the third example aspect) and/or from network function consumer 100 (e.g. apparatus of the first example aspect). The certification authority server 400 may further be configured to execute, step M402 of constructing an NF certificate 500, in particular at least partially be based on the obtaining of the NF certificate request in step M400. For instance, the constructing of the NF certificate may comprise filling in at least one information element of authorization information informative of a service authorization into an NF certificate 500. For instance the CA server 400 may have obtained at least one authorization detail, in particular as part of the NF certificate request, in particular from the network manager 300 and/or from the NFc 100, and may input at least one of these authorization details and/or at least one information element indicative of at least a part of the authorization information indicated by the authorization details into the NF certificate 500.

Figure 10:
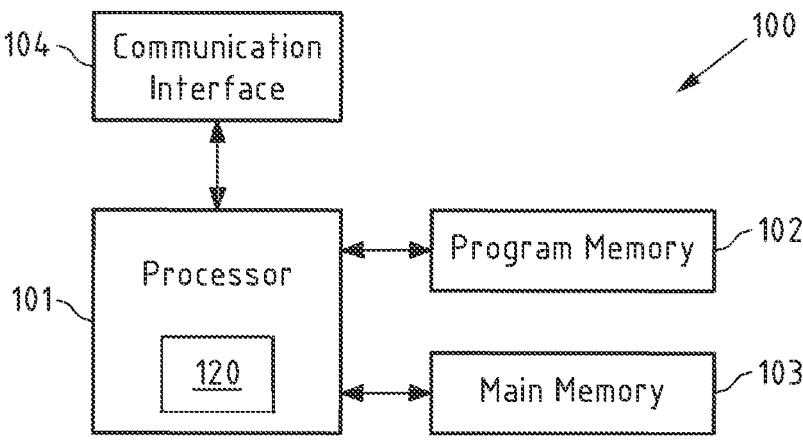
FIG. 10 a schematic diagram of a network function consumer according to the first example aspect.

FIG. 10 shows a schematic block diagram or a functional block of an NFc 100 according to at least some example aspects. The NFc 100 comprises a communication interface 104. The communication interface 104 may comprise at least one antenna. Additionally or alternatively, the communication interface 104 may correspond to a virtual communication means that allows exchange of information with other entities of the communication network 1. The NFc 100 further comprises at least one main memory 103 and/or at least one program memory 102. The instructions of the first example aspect may be stored on the main memory 103 and/or the program memory 102. The NFc device 100 may further comprise at least one processor 101.

The NFc 100 may comprise an obtainer 120. The obtainer 120 may be configured to obtain an NF certificate 500. The NF certificate 500 may particular comprise at least one information element of authorization information indicative of a service authorization of the NFc. The NF certificate 500 may further be indicative of an identity of the NFc that may be validated by an NFp 200 (e.g. apparatus of the second example aspect).

Figure 11:
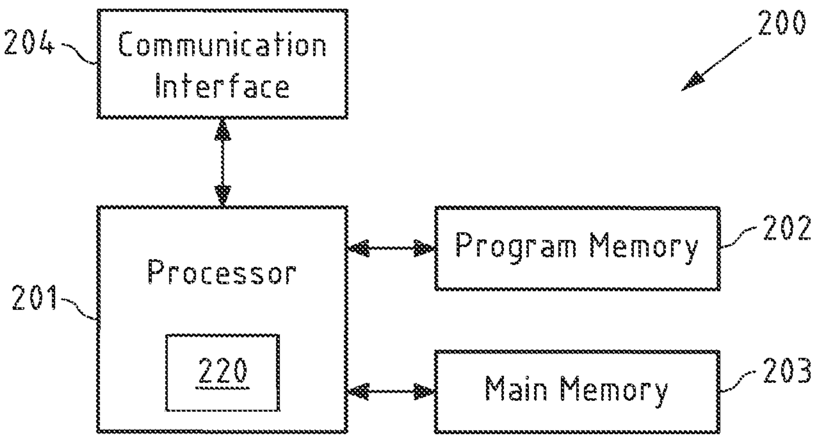
FIG. 11 a schematic diagram of a network function producer according to the second example aspect.

FIG. 11 shows a schematic block diagram or a functional block of a NFp 200 according to at least some example aspects. The NFp 200 comprises a communication interface 204. The communication interface 204 may comprise at least one antenna. Additionally or alternatively, the communication interface 204 may correspond to a virtual communication means that allows exchange of information with other entities of the communication network 1. The NFp 200 further comprises at least one main memory 203 and/or at least one program memory 202. The instructions of the second example aspect may be stored on the main memory 203 and/or the program memory 202. The NFp 200 may further comprise at least one processor 201.

The NFp 200 may comprise a validator 220. The validator 220 may be configured to validate an identity of an NFc 100 (e.g. apparatus of the first example aspect) and/or an authorization of an NFc 100, in particular of an NFc 100 requesting a service from the NFp 200 in a service request 110.

Figure 12:
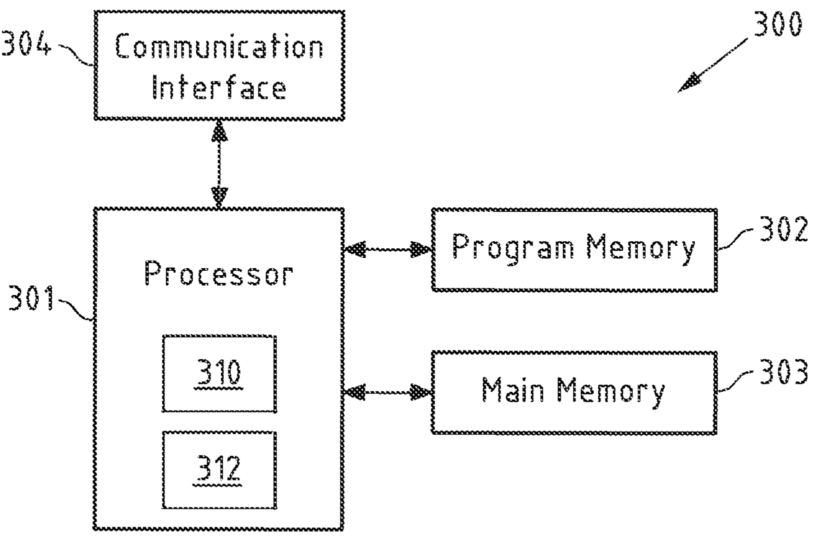
FIG. 12 a schematic diagram of a network manager according to the third example aspect.

FIG. 12 shows a schematic block diagram or a functional block of a network manager 300 according to at least some example aspect. The network manager 300 comprises a communication interface 304. The communication interface 304 may comprise at least one antenna. Additionally or alternatively, the communication interface 304 may correspond to a virtual communication means that allows exchange of information with other entities of the communication network 1. The network manager 300 further comprises at least one main memory 303 and/or at least one program memory 302. The instructions of the third example aspect may be stored on the main memory 303 and/or the program memory 302. The network manager 300 may further comprise at least one processor 301.

The network manager 300 may comprise a transmitter 320. The transmitter 320 may be configured to transmit a NF certificate request, in particular to a CA server 400 (e.g. apparatus of the fourth example aspect) and/or to an NFc 100 (e.g. apparatus of the first example aspect). The NF certificate request may comprise authorization details. The NF certificate request may be indicative of a service authorization, particular of the NFc 100.

Figure 13:
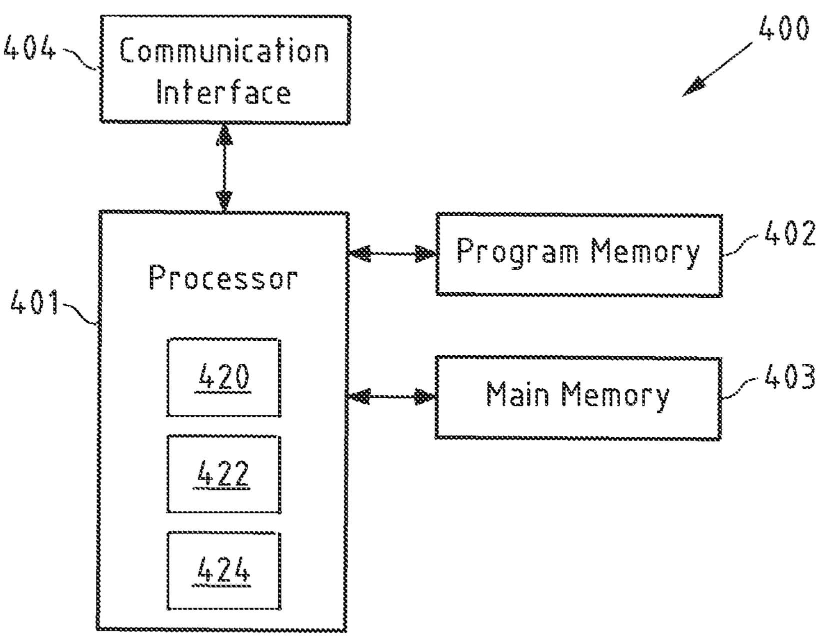
FIG. 13 a schematic diagram of a certification authority server according to the fourth example aspect.

FIG. 13 shows a schematic block diagram or a functional block of a CA server 400 according to at least some example aspects. The CA server 400 comprises a communication interface 404. The communication interface 404 may in particular comprise at least one antenna. Additionally or alternatively, the communication interface 404 may correspond to a virtual communication means that allows exchange of information with other entities of the communication network 1. The CA server 400 further comprises at least one main memory 403 and/or at least one program memory 402. The instructions of the fourth example aspect may be stored on the main memory 403 and/or the program memory 402. The CA server 400 may further comprise at least one processor 401.

The CA server 400 may further comprise at least one obtainer 420. The obtainer 420 may be configured to obtain an NF certificate request from a network manager 300 (e.g. apparatus of the third example aspect) and/or from an NFc 100 (e.g. apparatus of the first example aspect). The NF certificate request may particular be indicative of a service authorization. The service authorization may specify that the NFc 100 is permitted to access at least one limited service provided by at least one permitted NFp 200 (e.g. apparatus of the second example aspect).

The CA server 400 may further comprise a constructor 422. The constructor 422 may be configured to construct at least one NF certificate 500. The constructed NF certificate 500 may be indicative of an identity of an NFc 100 and may allow the authentication of the NFc 100 by at least one NFp 200. The constructed NF certificate 500 may further comprise at least one authorization information. The authorization information may be indicative of the service authorization.

The CA server 400 may further comprise a transmitter 424. The transmitter may be configured to transmit the NF certificate 500 to the network operator 300 and/or to the NFc 100.

The program and/or main memory 102, 103, 202, 203, 302, 303, 402, 403 of the corresponding apparatuses 100, 200, 300 and/or 400 may comprise random-access memory (RAM) and/or read-only memory (ROM). The program and/or main memory 102, 103, 202, 203, 302, 303, 402, 403 may comprise at least one RAM chip, and/or at least one ROM chip, and/or at least one flash memory chip. The program and/or main memory 102, 103, 202, 203, 302, 303, 402, 403 may comprise solid-state, magnetic, and/or optical memory, for example. The program and/or main memory 102, 103, 202, 203, 302, 303, 402, 403 may be at least in part accessible to the corresponding at least one processor 101, 202, 301 or 401, The program and/or main memory 102, 103, 202, 203, 302, 303, 402, 403 may be at least in part comprised in the corresponding at least one processor 101, 202, 301 or 401. The program and/or main memory 102, 103, 202, 203, 302, 303, 402, 403 may be at least in part external to the corresponding apparatus 100, 200, 300 or 400. The program and/or main memory 102, 103, 202, 203, 302, 303, 402, 403 may comprise instructions that the corresponding at least one processor 101, 202, 301 or 401 is configured to execute. The apparatus 100, 200, 300 or 400 may be configured to perform certain actions by storing in the corresponding program and/or main memory 102, 103, 202, 203, 302, 303, 402 and/or 403 instructions at least for performing, with the corresponding at least one processor 101, 202, 301 or 401, these actions.

Figure 14:
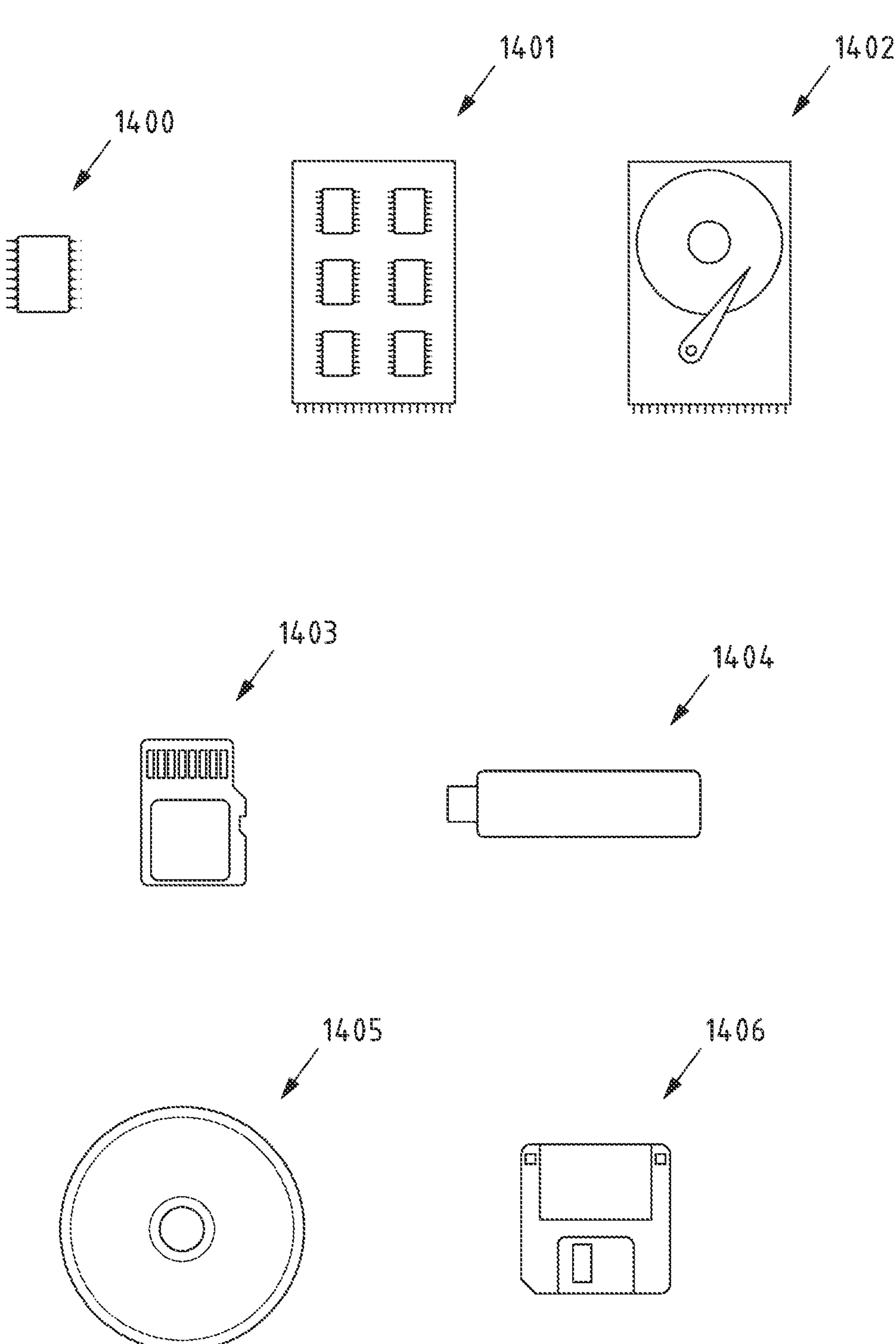
FIG. 14 examples of storage media.

FIG. 14 is a schematic illustration of examples of tangible and/or non-transitory computer-readable storage media that may comprise instructions for causing an apparatus to perform actions according to one or more example embodiments of the present invention, such as a flash memory 1400, which may for instance be soldered or bonded to a printed circuit board, a solid-state drive (SSD) 1401 comprising a plurality of memory chips (e.g. Flash memory chips), a magnetic hard drive 1402, a Secure Digital (SD) card 1403, a Universal Serial Bus (USB) memory stick 1404, an optical storage medium 1405 (such as for instance a CD-ROM or DVD) and a magnetic storage medium 1406.

Embodiment 1

A method, e.g. performed by a network function consumer (NFc), comprising:

obtaining a network function certificate, NF certificate; wherein the NF certificate is indicative of an identity of the NFc for authentication of the NFc by at least one network function producer, NFp; and the NF certificate comprises at least one information element of authorization information indicative of a service authorization specifying that the NFc is permitted to access at least one permitted service provided by at least one permitted NFp.

Embodiment 2

The method according to Embodiment 1, further comprising:

obtaining the NF certificate from a network manager.

Embodiment 3

The method according to Embodiment 1 or 2, further comprising:

obtaining at least one service authorization detail indicative of the service authorization from a network manager;

transmitting a network function certificate request, NF certificate request, to a certification authority server, CA server, wherein the NF certificate request is indicative of the service authorization; and obtaining the NF certificate from the CA server.

Embodiment 4

The method according to any of Embodiments 1 to 3, wherein:

the NF certificate is at least partially or entirely constructed by a CA server, and/or the service authorization is configured by a network manager.

Embodiment 5

The method according to any of Embodiments 1 to 4, wherein the service authorization specifies at least one of the following:

one or more permitted services the NFc is allowed to access;

at least one NFp instance on which the NFc is allowed to access the at least one or more permitted services;

a type of NFp on which the NFc is allowed to access the at least one or more permitted services;

a duration during which and/or a time limit until which the NFc is allowed to access the at least one or more permitted services; or a number of times the NFc is allowed to access the at least one or more permitted services.

Embodiment 6

The method according to any of Embodiments 1 to 5, wherein the NF certificate is an X.509 certificate and/or a transport layer security certificate, TLS certificate, comprising and/or being embedded with the at least one information element of authorization information.

Embodiment 7

The method according to any of Embodiments 1 to 6, further comprising:

transmitting a network function service request, NF service request, to an NFp, wherein the NF service request comprises the NF certificate; and the NF service request is indicative of at least one desired service provided by the NFp.

Embodiment 8

The method according to any of Embodiments 1 to 7, wherein the NF service request is transmitted via mutual transport layer security protocol.

Embodiment 9

The method according to any of Embodiments 1 to 8, further comprising:

obtaining a service response from the NFp.

Embodiment 10

The method according to any of Embodiments 1 to 9, wherein the method is executed by an apparatus comprising an NFc, an apparatus being the NFc, or an apparatus comprised in the NFc.

Embodiment 11

A method, e.g. performed by a network function producer (NFp), comprising:

means for validating a network function certificate, NF certificate, wherein the NF certificate is indicative of an identity of a network function consumer, NFc, for authentication of the NFc by least one NFp; and the NF certificate comprises at least one information element of authorization information indicative of a service authorization specifying that the NFc is permitted to access at least one permitted service provided by at least one permitted NFp.

Embodiment 12

The method according to Embodiment 11, further comprising:

obtaining a network function service request, NF service request, from an NFc indicative of at least one desired service provided by the NFp, wherein the NF certificate to be validated is comprised by the NF service request.

Embodiment 13

The method according to Embodiment 11 or 12, wherein the means for validating comprises at least one of:

authenticating the NFc based on the NF certificate; or evaluating if the NFc is permitted to access at least one of the at least one desired services of the NFp.

Embodiment 14

The method according to any of Embodiments 11 to 13, further comprising:

transmitting a service response to the NFc, wherein at least a part of the service response depends on a result of the validating.

Embodiment 15

The method according to any of Embodiments 11 to 14, wherein the method is executed by an apparatus comprising an NFp, an apparatus being the NFp, or an apparatus comprised in the NFp.

Embodiment 16

A method, e.g. performed by a network manager, comprising:

transmitting a network function certificate request, NF certificate request, to at least one of a certification authority server, CA server, or a network function consumer, NFc; wherein the NF certificate request is indicative of a service authorization specifying that the NFc is permitted to access at least one permitted service provided by at least one permitted network function producer, NFp.

Embodiment 17

The method according to Embodiment 16, further comprising:

obtaining a network function certificate, NF certificate, from the CA server, wherein the NF certificate is indicative of an identity of the NFc for authentication of the NFc by at least one NFp; and the NF certificate comprises at least one information element of authorization information indicative of the service authorization; and transmitting the NF certificate to the NFc.

Embodiment 18

The method according to Embodiment 16 or 17, wherein the method is executed by an apparatus comprising a network manager, an apparatus being the network manager, or an apparatus comprised in the network manager.

Embodiment 19

A method, e.g. performed by a certification authority server, CA server, comprising:

obtaining a network function certificate request, NF certificate request, from a network manager and/or from a network function consumer, NFc, wherein the NF certificate request is indicative of a service authorization specifying that an NFc is permitted to access at least one permitted service provided by at least one permitted network function producer, NFp; and constructing a network function certificate, NF certificate, wherein the NF certificate is indicative of an identity of the NFc for authentication of the NFc by least one NFp; and the NF certificate comprises at least one information element of authorization information indicative of the service authorization; and means for transmitting the NF certificate to at least one of: the network manager, or the NFc.

Embodiment 20

The method according to Embodiment 19, wherein the method is executed by an apparatus comprising a CA server, an apparatus being the CA server, or an apparatus comprised in the CA server.

Embodiment 21

A first apparatus comprising respective means for performing the method of any of embodiments 1 to 10.

Embodiment 22

A first apparatus comprising at least one processor and at least one memory storing instructions that, when executed by the at least one processor, cause an apparatus at least to perform and/or control the method according any of embodiments 1 to 10.

Embodiment 23

A second apparatus comprising respective means for performing the method of any of embodiments 11 to 15.

Embodiment 24

A second apparatus comprising at least one processor and at least one memory storing instructions that, when executed by the at least one processor, cause an apparatus at least to perform and/or control the method according any of embodiments 11 to 15.

Embodiment 25

A third apparatus comprising respective means for performing the method of any of embodiments 16 to 18.

Embodiment 26

A third apparatus comprising at least one processor and at least one memory storing instructions that, when executed by the at least one processor, cause an apparatus at least to perform and/or control the method according any of embodiments 16 to 18.

Embodiment 27

A fourth apparatus comprising respective means for performing the method of any of embodiments 19 or 20.

Embodiment 28

A fourth apparatus comprising at least one processor and at least one memory storing instructions that, when executed by the at least one processor, cause an apparatus at least to perform and/or control the method according any of embodiments 19 or 20.

Embodiment 29

A computer program, the computer program when executed by a processor causing an apparatus, e.g. the apparatus according to any of embodiments 21 to 28, to perform and/or control the actions and/or steps of the method of any of embodiments 1 to 20.

Embodiment 30

A computer program product comprising a computer program according to embodiment 29.

Embodiment 31

A system comprising:

at least one first apparatus according to any of the embodiments 21 to 22;

at least one second apparatus according to any of the embodiments 23 to 24;

at least one third apparatus according to any of the embodiments 25 to 26; and/or at least one fourth apparatus according to any of the embodiments 27 to 28.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Having the same meaning as the expression "A and/or B", the expression "at least one of A or B" may be used herein. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only examples, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

The invention claimed is:

1. An apparatus for a network function consumer, NFc, comprising:

at least one processor; and at least one memory storing instructions that, when executed by the at least one processor, cause the user equipment at least to perform:

obtaining a network function certificate, NF certificate; wherein the NF certificate is indicative of an identity of the NFc for authentication of the NFc by at least one network function producer, NFp; and the NF certificate comprises at least one information element of authorization information indicative of a service authorization specifying that the NFc is permitted to access at least one permitted service provided by at least one permitted NFp, wherein the NF certificate comprises an X.509 certificate and/or a transport layer security certificate, TLS certificate, comprising and/or being embedded with the at least one information element of authorization information;

transmitting a network function service request, NF service request, to the NFp via a mutual transport layer security protocol, wherein the mutual transport layer security protocol is based upon the at least one information element of authorization information indicative of the service authorization of the NF certificate;

the NF service request comprises the NF certificate; and the NF service request is indicative of at least one desired service provided by the NFp; and obtaining a service response from the NFp, wherein at least a part of the service response depends on the at least one information element of authorization information.

2. The apparatus according to claim 1, wherein the at least one memory and the instructions, when executed by the at least one processor, further cause the user equipment at least to perform:

obtaining the NF certificate from a network manager.

3. The apparatus according to claim 1, wherein the at least one memory and the instructions, when executed by the at least one processor, further cause the user equipment at least to perform:

obtaining at least one service authorization detail indicative of the service authorization from a network manager;

transmitting a network function certificate request, NF certificate request, to a certification authority server, CA server, wherein the NF certificate request is indicative of the service authorization; and obtaining the NF certificate from the CA server.

4. The apparatus according to claim 1, wherein the NF certificate is at least partially or entirely constructed by a CA server, and/or the service authorization is configured by a network manager.

5. The apparatus according to claim 1, wherein the service authorization specifies at least one of the following:

one or more permitted services the NFc is allowed to access;

at least one NFp instance on which the NFc is allowed to access the at least one or more permitted services;

a type of NFp on which the NFc is allowed to access the at least one or more permitted services;

a duration during which and/or a time limit until which the NFc is allowed to access the at least one or more permitted services; or a number of times the NFc is allowed to access the at least one or more permitted services.

6. The apparatus according to claim 1, wherein the apparatus comprises the NFc, is the NFc, or is comprised in the NFc.

7. An apparatus for a network function producer, NFp, comprising:

at least one processor; and at least one memory storing instructions that, when executed by the at least one processor, cause the user equipment at least to perform:

obtaining a network function service request, NF service request, from an NFc indicative of at least one desired service provided by the NFp via a mutual transport layer security protocol, the mutual transport layer security protocol based upon at least one information element of authorization information indicative of a service authorization of an NF certificate to be validated, wherein the NF certificate to be validated is comprised by the NF service request;

validating a network function certificate, NF certificate, wherein the NF certificate is indicative of an identity of a network function consumer, NFc, for authentication of the NFc by least one NFp; and the NF certificate comprises the at least one information element of authorization information indicative of the service authorization specifying that the NFc is permitted to access at least one permitted service provided by at least one permitted NFp, wherein the NF certificate comprises an X.509 certificate and/or a transport layer security certificate, TLS certificate, comprising and/or being embedded with the at least one information element of authorization information; and transmitting a service response to the NFc, wherein at least a part of the service response depends on the at least one information element of authorization information.

8. The apparatus according to claim 7, wherein the validating comprises at least one of:

authenticating the NFc based on the NF certificate; or evaluating if the NFc is permitted to access at least one of the at least one desired services of the NFp.

9. The apparatus according to claim 7, wherein at least a part of the service response depends on a result of the validating.

10. The apparatus according to claim 7, wherein the apparatus comprises the NFp, is the NFp, or is comprised in the NFp.

11. An apparatus for a network manager, comprising:

at least one processor; and at least one memory storing instructions that, when executed by the at least one processor, cause the user equipment at least to perform:

transmitting a network function certificate request, NF certificate request, to at least one of a certification authority server, CA server, or a network function consumer, NFc; wherein the NF certificate request is indicative of a service authorization specifying that the NFc is permitted to access at least one permitted service provided by at least one permitted network function producer, NFp;

obtaining a network function certificate, NF certificate, from the CA server, wherein the NF certificate is indicative of an identity of the NFc for authentication of the NFc by at least one NFp; and the NF certificate comprises at least one information element of authorization information indicative of the service authorization and is configured for a mutual transport layer security protocol between the NFc and NFp, wherein the at least one information element of authorization information is configured to be included in a service response to the NFc, wherein the NF certificate comprises an X.509 certificate and/or a transport layer security certificate, TLS certificate, comprising and/or being embedded with the at least one information element of authorization information; and transmitting the NF certificate to the NFc.

12. The apparatus according to claim 11, wherein the apparatus comprises the network manager, is the network manager, or is comprised in the network manager.

* * * * *